US009722995B2

United States Patent
Chang et al.

(10) Patent No.: US 9,722,995 B2
(45) Date of Patent: *Aug. 1, 2017

(54) MANAGING AND SECURING MANAGEABLE RESOURCES IN STATELESS WEB SERVER ARCHITECTURE USING SERVLET FILTERS

(71) Applicant: International Business Machines Corporation, Armonk, NY (US)

(72) Inventors: David Yu Chang, Austin, TX (US); John Yow-Chun Chang, Austin, TX (US); Vishwanath Venkataramappa, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 247 days.

This patent is subject to a terminal disclaimer.

(21) Appl. No.: 14/593,639

(22) Filed: Jan. 9, 2015

(65) Prior Publication Data

US 2015/0222626 A1 Aug. 6, 2015

Related U.S. Application Data

(63) Continuation of application No. 12/858,090, filed on Aug. 17, 2010, now Pat. No. 9,021,093.

(51) Int. Cl.
*G06F 15/173* (2006.01)
*H04L 29/06* (2006.01)
(Continued)

(52) U.S. Cl.
CPC ........ *H04L 63/083* (2013.01); *G06F 17/3089* (2013.01); *H04L 63/10* (2013.01)

(58) Field of Classification Search
CPC H04L 29/06; H04L 29/08072; H04L 29/0809
(Continued)

(56) References Cited

U.S. PATENT DOCUMENTS 6,094,665 A 7/2000 Lyons et al.
2004/0019697 A1 1/2004 Rose
(Continued)

OTHER PUBLICATIONS

Costello, Roger L.; "Building Web Services the REST Way", published online and retrieved from http://www.xfront.com/REST-Web-Services.html on May 21, 2010.
(Continued)

*Primary Examiner* — Alan S Chou
(74) *Attorney, Agent, or Firm* — Robert H. Frantz; Scott S. Dobson

(57) ABSTRACT

Access is controlled to managed resources in a stateless web server architecture including a stateless web server computing platform; a resource locator map portion of the stateless web server computing platform providing a unique resource locator code representing each managed resource in a stateless web server architecture, wherein the managed resource is assigned to a plurality of application program components; a set of servlet filters disposed in a portion of the stateless web server computing platform, each servlet filter associated with one of the application program components; a resource locator matcher portion of the stateless web server computing platform, responsive to a user request to a unique resource locator, matching a pattern in the user request to one or more of the application program components using a corresponding servlet filter; and a request dispatcher portion of the stateless web server computing platform sending the user request to the matched application program component, wherein the application program component receives and processes the user request.

15 Claims, 9 Drawing Sheets

(51) Int. Cl.
*G06F 17/30* (2006.01)
*G06F 17/00* (2006.01)

(58) Field of Classification Search
USPC ............................................. 709/225; 726/7
See application file for complete search history.

(56) References Cited

U.S. PATENT DOCUMENTS

| | | |
|---|---|---|
| 2004/0167960 A1 | 8/2004 | Kinner et al. |
| 2006/0031205 A1* | 2/2006 | Perkins ............. G06F 17/30887 |
| 2007/0083671 A1* | 4/2007 | Linn ................. G06F 17/30864 |
| | | 709/245 |
| 2008/0319761 A1 | 12/2008 | Da Palma et al. |
| 2009/0164485 A1* | 6/2009 | Burke ............... G06F 17/30961 |
| 2009/0187573 A1 | 7/2009 | Johnston et al. |
| 2009/0210807 A1 | 8/2009 | Xiao et al. |
| 2009/0240728 A1 | 9/2009 | Shukla et al. |
| 2009/0328205 A1 | 12/2009 | Ims et al. |
| 2010/0083361 A1 | 4/2010 | Fleming et al. |
| 2011/0307458 A1 | 12/2011 | Lipscomb et al. |
| 2012/0137213 A1 | 5/2012 | Hayler et al. |

OTHER PUBLICATIONS

Fielding, Roy Thomas; "Architectural Styles and the Design of Network-based Software Architectures", Ph.D. dissertation at the University of California (Irvine), published online and retrieved from http://www.ics.uci.edu/~fielding/pubs/dissertation/fielding_dissertation_2up.pdf on May 21, 2010.

Rodriguez, Alex; "RESTful Web services: The basics"; published online and retrieved on Aug. 3, 2010 from http://download.boulder.ibm.com/ibmdl/pub/software/dw/webservices/ws-restful/ws-restful-pdf.pdf.

Sun, Bruce; "A multi-tier architecture for building RESTful Web services"; published online and retrieved on Aug. 3, 2010 from http://download.boulder.ibm.com/ibmdl/pub/software/dw/ajax/wa-aj-multitier/wa-aj-multitier-pdf.pdf.

Eugen; "Securing a RESTful Web Service with Spring Security 3.1", posted on Oct. 31, 2011, retrieved on Apr. 15, 2012, from http://www.baeldung.com.

US Army; "Wear and Appearance of Army Uniforms and Insignia", May 11, 2012, Army Regulation 670-1, pp. 251-254.

dictionary.com; definition of "hash mark", accessed on Jan. 7, 2014.

LSOFT; "5.7 Using Merged Parameters with URLs", retrieved from http://www.lsof.com/manuals/Maestro/Maestro_Users on Jan. 7, 2014.

PC.NET; "What is the different between a backslash and a forward slash?", retrieved from http://pc.net/helpcenter/print/backslash_vs_forward_slash on Jan. 7, 2014.

W3 Consortium; "3 Protocol Parameters", RFC 2616, retrieved from http://www.w3.org/Protocols/rfc2616/rfc2616-sec3.html on Jan. 7, 2014.

Stackoverflow; "what is the #! sign in the URL and what is [sic] it mean?", retrieved from http://stackoverflow.com/questions/5395330/what-is-the-sign-in-the-url on Jan. 7, 2014.

Wikipedia; "Number sign", retrieved from http://en.wikipedia.org/wiki/Number_sign on Jan. 7, 2014.

Wikipedia; "Slash (punctuation)", retrieved from http://en.wikipedia.org/wiki/Slash_(punctuation) on Jan. 7, 2014.

USPTO; final rejections in U.S. Appl. No. 10/955,449, (Perkins), mailed on Jul. 23, 2007.

* cited by examiner

700

```
<security-constraint id="SecurityConstraint_1">
    <web-resource-collection id="WebResourceCollection_1">
        <web-resource-name>REST Servlet</web-resource-name>
        <url-pattern>/Server/server1/attrName/password*</url-pattern>
        <http-method>GET</http-method>
        <http-method>POST</http-method>
    </web-resource-collection>
    <auth-constraint id="AuthConstraint_1">
        <role-name>server1AdminSecurity</role-name>
    </auth-constraint>
</security-constraint>
```

Fig. 7

```
<filter id="Filter_1">
  <filter-name>PortalResourceFilter</filter-name>
  <filter-class>PortalResourceFilter</filter-class>
  <description>
      Handles all portal server resources
  </description>
  <init-param>// optional
    <param-name>
        ParameterName
    </param-name>
    <param-value>
        ParameterValue
    </param-value>
  </init-param>
</filter>
```

```
<filter-mapping>
    <filter-name>PortalResourceFilter</filter- name>
    <url-pattern>/portal/*</url-pattern>
      // can be servlet <servlet>servletName</servlet> If
      // you want to look at all the resources.
</filter-mapping>
```

Fig. 8

```
import javax.servlet.*;
public class PortalResourceFilter implements Filter {
protected FilterConfig filterConfig;
  // Called once when this filter is instantiated.
  public void init(FilterConfig filterConfig) throws ServletException {
    this.filterConfig = filterConfig;
    }
  public void destroy() {
    this.filterConfig = null;
    }
  // Called for every request that is mapped to this filter.
  public void doFilter(ServletRequest request, ServletResponse response,
      FilterChain chain)
  throws java.io.IOException, ServletException {
  // Manage the resource specified by the URL
  callPortalResourceManagement(URL);
  // Call other components if any that wants to handle the same resource
  //chain.doFilter(request, response);
  }
}
```

Fig. 9

MANAGING AND SECURING MANAGEABLE RESOURCES IN STATELESS WEB SERVER ARCHITECTURE USING SERVLET FILTERS

CROSS-REFERENCE TO RELATED APPLICATIONS (CLAIMING BENEFIT UNDER 35 U.S.C. 120)

This is a continuation of U.S. patent application Ser. No. 12/858,090, filed on Aug. 17, 2010, our docket AUS920100147US2, by David Yu Chang, et al.

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

U.S. patent application Ser. No. 12/858,090, filed on Aug. 17, 2010, our docket AUS920100147US2, by David Yu Chang, et al., is incorporated by reference in its entirety including its drawings.

FIELD OF THE INVENTION

The invention generally relates technologies to manage resources in a web server having a stateless architecture.

BACKGROUND OF INVENTION

Web servers often provide complicated services to the consumers or "visitors" to the web sites that they host. Some "visitors" are web browser programs being executed by client computers or web-enabled devices such as smartphones. In this situations, a human usually is operating the web browser, and the service is something the human user needs, such as news, social networking, information searching, bank account management, etc.

In other cases, the "visitors" of the hosted web service are other programs needing the functionality provided by the hosted service, such as calculation of mortgage payments, checking inventory of available products, obtaining available flight information, etc. From the web server's perspective, it is often indistinguishable what type of remote "user" is accessing the hosted service—human or machine.

In early generations of web-based services, a series of "screens" or pages would be provided from the web server to the remote user according to the input provided by the remote user, and based upon the logic of the hosted service. These logical processes were often designed according to state machine logic, in which the web server tracked the "state" of the current session with the user in order to assist in determined what the next state of the service should be for that remote user. The web server was responsible for "remembering" each client and their session states and statuses.

However, in the evolution of web-based services in which several servers, not just one, may contribute to the overall hosted service, this type of centralized state machine logic on the web server because inefficient, difficult to design, and difficult to debug. For example, commonly, a user may use a web browser to access a news web page which has text and picture (hosted by the main news web server), advertisements (hosted by separate ad servers), and videos (hosted by still separate video servers). The web page becomes a point of integration of information from all of these web servers, but forcing one web server to logically and functionally integrate all of the separate state machines for all of these source providers is problematic.

"Stateless" web server architectures have been developed to address this shift in web-based service hosting. A widely-adopted stateless web server architecture is Representational State Transfer (REST), which is reported to have been proposed in 2000 by Roy Fielding at the University of California, Irvine. In stateless web server architectures, the current state of a client's session is recorded by sending a trackable file, such as a cookie file, to the remote client device, where it is stored and then, later, returned to the web server with the next request. In classic state machine design, this means that the state machine executed by the web server is indexed by a state variable stored by the remote client. This architecture goes further to enable the different state machines on different servers which are contributing content or functionality to a client's session to use the state variable supplied by or from the client, without having to pass the state variable through a central or integrating web server.

SUMMARY OF THE INVENTION

Access is controlled to managed resources in a stateless web server architecture including a stateless web server computing platform; a resource locator map portion of the stateless web server computing platform providing a unique resource locator code representing each managed resource in a stateless web server architecture, wherein the managed resource is assigned to a plurality of application program components; a set of servlet filters disposed in a portion of the stateless web server computing platform, each servlet filter associated with one of the application program components; a resource locator matcher portion of the stateless web server computing platform, responsive to a user request to a unique resource locator, matching a pattern in the user request to one or more of the application program components using a corresponding servlet filter; and a request dispatcher portion of the stateless web server computing platform sending the user request to the matched application program component, wherein the application program component receives and processes the user request.

BRIEF DESCRIPTION OF THE DRAWINGS

The description set forth herein is illustrated by the several drawings.

FIG. 7 sets forth example code in which different security constraints can readily be applied to different attributes within a resource to provide fine grained control.

FIG. 8 illustrates naming a servlet filter and assigning the corresponding implementation class to the servlet filter, as well as mapping the servlet filter to a URL or servlet.

FIG. 9 shows example code to provide a specific servlet filter.

DETAILED DESCRIPTION OF EMBODIMENT(S) OF THE INVENTION

The inventors of the present invention have recognized a problem in the art not previously recognized or addressed regarding administration of stateless web servers and the application programs they host.

Figure 2:
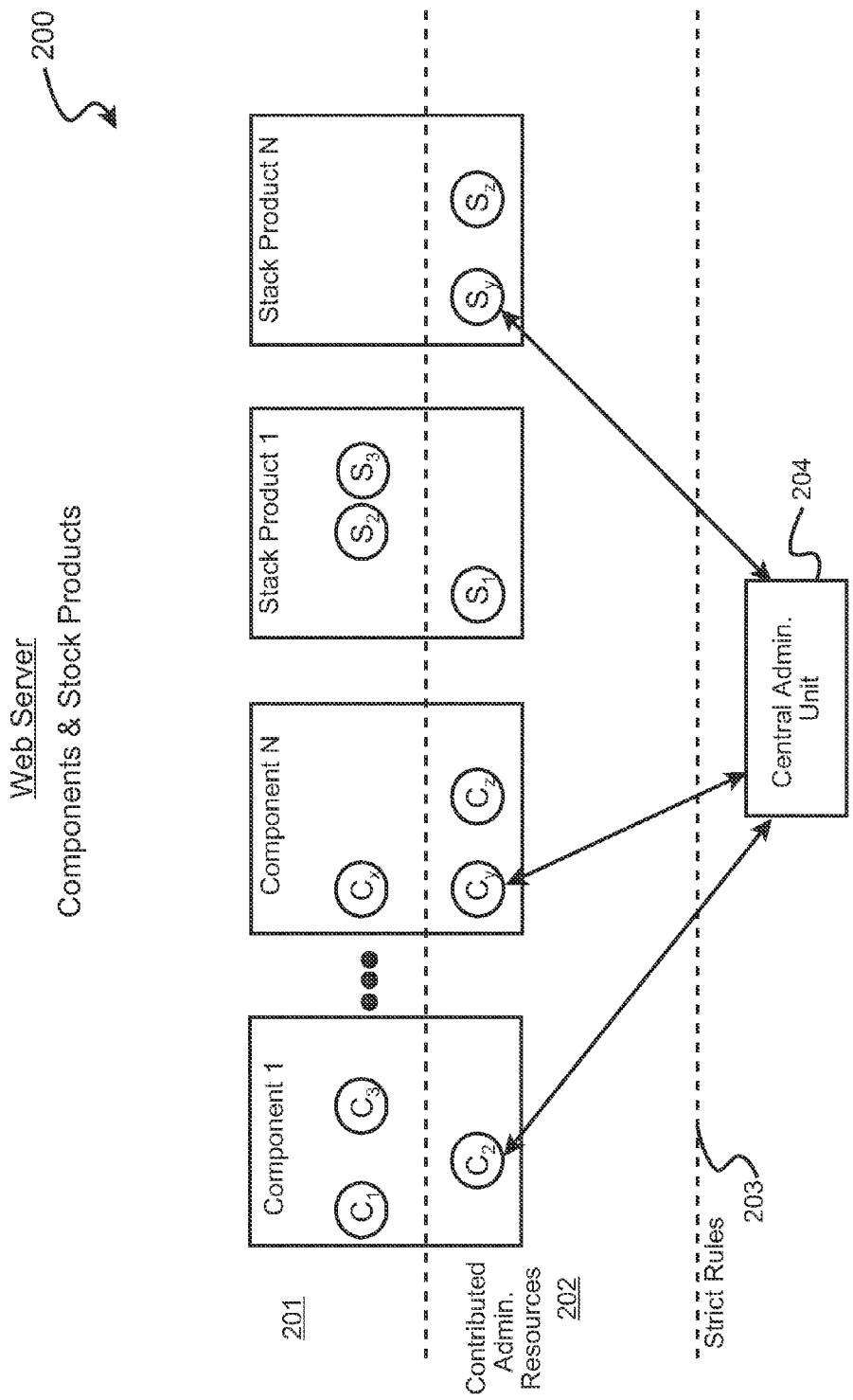
FIG. 2 illustrates a complex system such as a hosted web service application program having many administrative resources contributed to the system by different components and stack products.

A complex system such as a hosted web service application program (e.g. IBM WebSphere™ or similar) normally consists of many administrative (202) ($C_2$, $C_y$, and $S_z$,) resources contributed to the system (200) by different components and stack products (201), as shown in FIG. 2. A current solution in WebSphere, for example, to handle these contributed resources from various components and stack products within a single administrative component (204) is found to be more complex and difficult to manage because the central administrative component needs to have full interface and functionality information for the resources and their behavior. But, since resources are contributed by different components and different stack products, it is difficult to design a central administrative component capable of anticipating all such interface and functionalities in order to manage all the possible different resources. Each component and stack product may use different strategy to represent resource and its behavior. The current solution WebsSphere product, for example, requires each component to adhere to strict rules (203) for defining resources and resource behavior. Resources which do not adhere to the strict rules ($C_z$ and $S_z$) cannot be administered through the central administration unit (204).

The inventors of the present invention have recognized a first problem in the art regarding managing administrative resources in a stateless web server of managing contributed resources which do not conform to rules according to a central administration unit.

The inventors have recognized a second problem in the art regarding securing administrative resources (instance based security) for stateless web servers. Instance based security of resources includes assigning different security constraints for different instances of resources, as well as assigning different security constraints for different attributes (or properties) of each resource instance (e.g. "fine grained security").

No known methods handle instance based security at attribute or properties level for stateless web servers, whereas current technologies perform security functions at the server in a client/server environment. In these arrangements, the communication between client and server is primarily Remote Procedure Call ("RPC") types of communication. The main drawback of RPC mechanism for performing fine grained security is that the information required to perform security needs to be extracted from the RPC methodname, parameter names, etc. But, there is no uniform way of identifying the resource. This makes it hard to perform fine grained authorization using RPC mechanism. Performing attribute based or instance based authorization is very difficult in this case if not impossible.

A stateless architecture, such as a "RESTful" architecture, addresses the problem of RPC. In RESTful architecture, each resource is represented by a Uniform Resource Locator ("URL"). This makes it easy to identify the resource being authorized.

Relying upon some of the advantages of such stateless architectures which use URL's to identify each resource, the present invention solves the foregoing problems and limitations of the existing art by providing access and usage authorization of system resources based on resource instance. Further, the present invention provides attribute level authorization efficiently, as well, which is otherwise difficult and inefficient in a standard RPC-based architecture.

Managing Administrative Resources

The present invention is expected to provide particularly great benefit to central administration technologies of stateless web servers, such as web servers implementing a RESTful architecture. The present invention may, however, be found to be useful in other web server architectures.

In a RESTful architecture, each resource is represented by a unique URL. When an end user specifies a URL to access a resource, that resource may belong to any one of many components and stack products with in the web server system.

Figure 3:
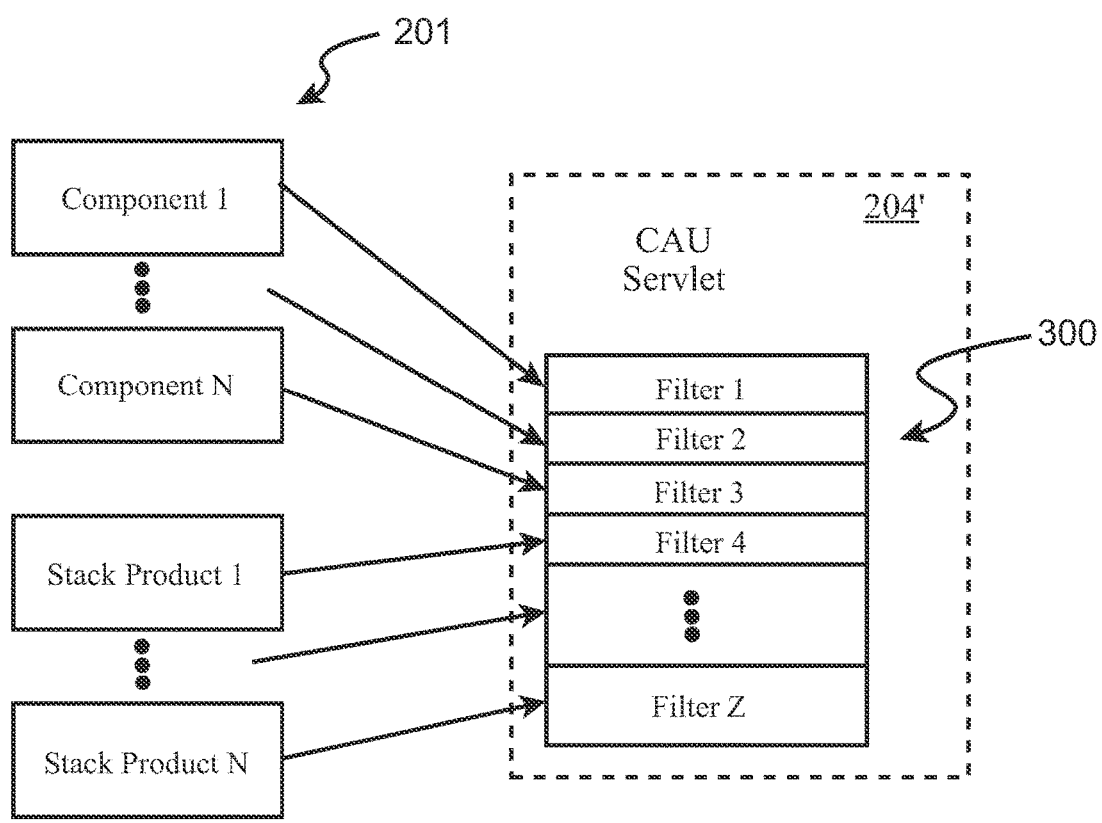
FIG. 3 depicts how each component in a stateless web server registers one or more servlet filters with a central administration unit.

As shown in FIG. 3, if all requests directly go to the central administrative unit (204'), the administrative unit must identify to which component the requested resource belongs. This requires the central administrative unit to have knowledge about all the components and stack products.

Figure 4:
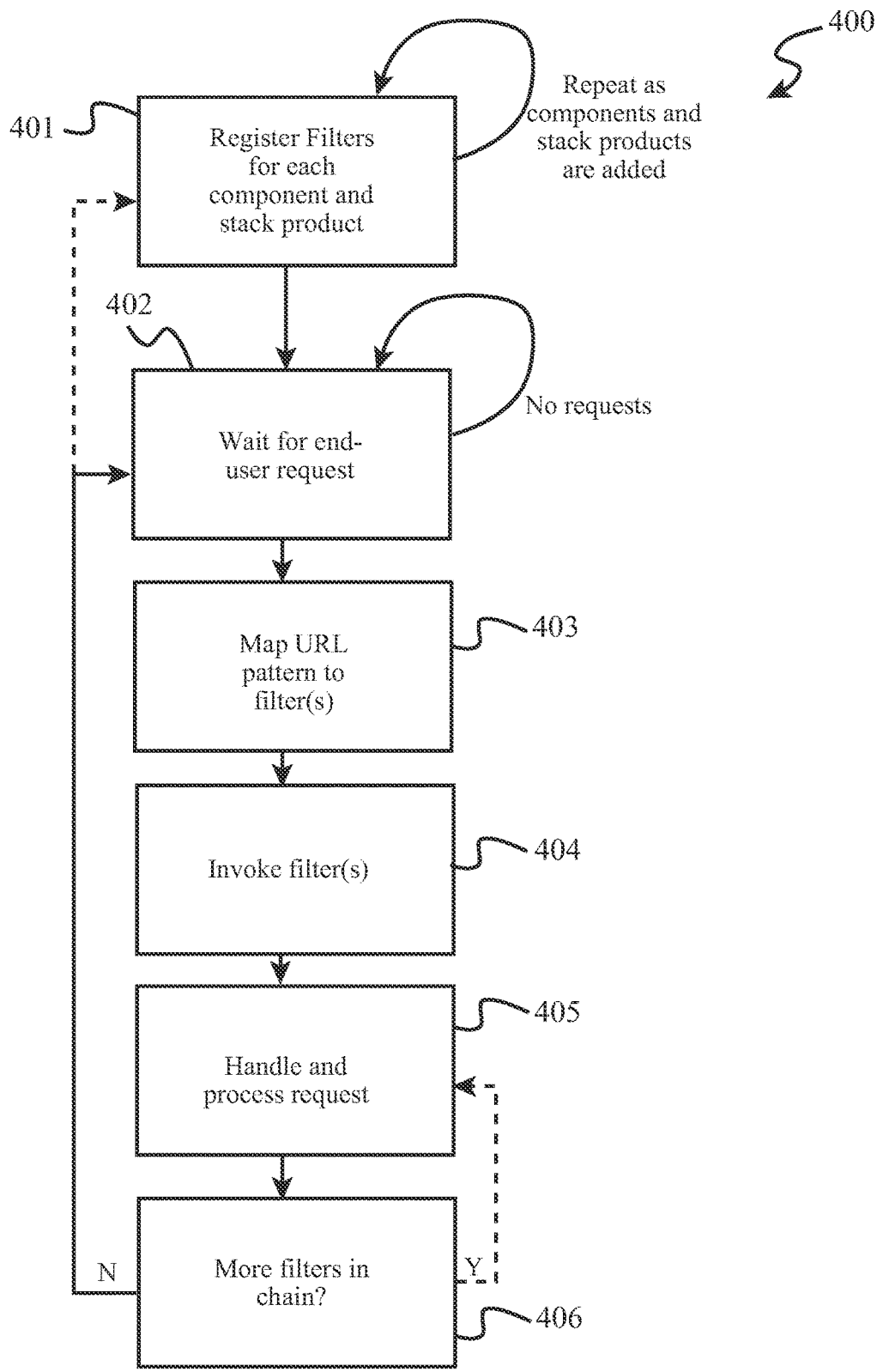
FIG. 4 sets forth a logical process according to the invention suitable for implementation as a processor executing a program, as a specific electronic circuit implementing the logic, or a combination of processor, program and circuit

Embodiments according to the present invention utilize servlet filters (300) to automatically dispatch the servlet request to the right component (201). Upon initialization, installation or registration, each component or stack product provides a servlet filter (401), as shown in FIG. 4. A servlet filter can be added based on the URL pattern associated with the component to which a resource belongs. Because resources directly map to the specific URL pattern, it is efficient for stack products to specify its own servlet filter.

Once servlet filters are specified for various resources, the central administration unit waits to receive resource requests from remote client users, the requests including a specific URL associated with the requested resource.

The received URL is then mapped to one or more servlet filters, which are then automatically invoked (404) to handle (404) the requested function or information. If the servlet filter code determines that the URL belongs to its component, it can handle the request and process request. After processing the request, it can call the next servlet filter in a servlet filter chain, if there is any (406). If the resource should not be handled by another servlet filter, it can simply return from the filter and no other filter is invoked (406).

There are several advantages to this particular logical process:
  a. Each resource is managed by the component that owns it.
  b. Processing is more distributed in nature.
  c. The process is highly scalable.
  d. The process is extensible, allowing ease of addition of new stack products.
  e. Each component/stack product can enforce its own security independent of each other and independent of the base product because each servlet filter can enforce the security instead of the servlet itself.

We now briefly discuss an alternate solution considered by the inventors, not in a manner of teaching away from the alternate solution, but as an illustration of an alternate embodiment according to the same invention. In this alternate embodiment, each stack product creates its own application (as opposed to servlet filter) to manage its own resources. A limitation of this approach is that the end user needs to know context root of each stack product's application. This makes its operation less transparent to the end user. Moreover, the same resource may need to be processed by multiple stack products in some cases and that will be difficult with different applications for each stack product. In some manners of use, however, these limitations may not be significant, so this alternative embodiment may be useful.

Securing Administrative Resources

Figure 6:
FIG. 6 provides example code to assign different security constraints for different URL patterns in the deployment descriptor of a stateless web server system.

To secure administrative resources, in one embodiment according to the invention, a RESTful application is implemented as a servlet application. Because all servlets undergo authorization based on URL pattern by the servlet container, then every resource instance is identifiable by a URL, and therefore, the embodiment of the invention is enabled to assign different security constraints for different URL patterns in the deployment descriptor of the RESTful application servlet, using code such as shown in FIG. 6, which includes two security constraints (600, 601), each of which specifies a URL pattern and a role name for that pattern (shown in bolded text).

This example descriptor is used by webcontainer (servlet container) to perform authorization. In this example, different roles are assigned for server (600) and application (601) resource instances. When a resource is accessed by an end user, proper authorization is automatically performed.

Attribute Based Authorization

By extending a stateless web server architecture to represent each attribute (as opposed to just each component) as a URL, different security constraints can readily be applied to different attributes within a resource, thereby providing fine grained control, as exemplified in FIG. 7. If there is a password attribute in the server1 resource, it may be needed to protect it using a different role in some situations.

A realization according to the invention such as this example provides several advantages:
a. Easy to configure fine grained security.
b. Uses an existing Java 2 Enterprise Edition™ ("J2EE") security model, so there is no need to design a new model.
c. There is no additional code required to be written to perform fine grained authorization.
d. It uses declarative security so that no programmatic security is required.

Example

Servlet Filter for a Stack Product

The following three general steps illustrate how readily a servlet filter to handle resources specific to Portal server in an WebSphere™ application server may be created.
1. Name the servlet filter and assign the corresponding implementation class to the servlet filter. Optionally, assign initialization parameters that get passed to the init( ) method of the servlet filter. See (800) in FIG. 8 for an example in web.xml, containing a servlet filter to handle all portal resources.
2. Map the servlet filter to URL or servlet. See (801) in FIG. 8 for an example implementation of this step.
3. Design or provide the specific servlet filter, such as the example shown in FIG. 9.

Adding Components and Stack Products

Since new components and stack products can be added to a web server at any time, new servlet filters need to be added at runtime, as well, for each component and stack product added. This can be accomplished by one of the by providing a tool to update the deployment descriptor, such as in web.xml, or A deployment descriptor difference ("delta") file (e.g. web-delta.xml) containing the new component's or stack product's filter should may be merged with application programs current deployment descriptor.

In either method, after the deployment descriptor is modified, the application program may need to be restarted to read the changes to deployment descriptor. If an application program needs to be available continuously, there are already other methods available in WebSphere™ to achieve this such as starting the same application in another server (with the new or updated deployment descriptor), and subsequently re-directing all calls to that server.

Security is automatically enforced by the web container because of declarative nature of security constraints. In addition to that, it is required to update the deployment descriptor when a new resource is created or deleted, as well. For example, after a new server is created, the deployment descriptor must be updated with new security constraint required for the new server created. Once the deployment descriptor is updated, the webcontainer must be caused to read the updated deployment descriptor. There are two ways to accomplish this, by providing a tool to update deployment descriptor of application that adds additional security constraints in the web.xml file, and a new deployment delta.xml file with additional security constraints can be added when a new resource is created and merged with existing web.xml file.

With either method, after deployment descriptor is updated, the authorization engine (webcontainer) will be informed to use the updated deployment descriptor. If an external authorization engine is being used, the external authorization module will be informed to read the new changes to the deployment descriptor.

Example of Operation

Figure 1:
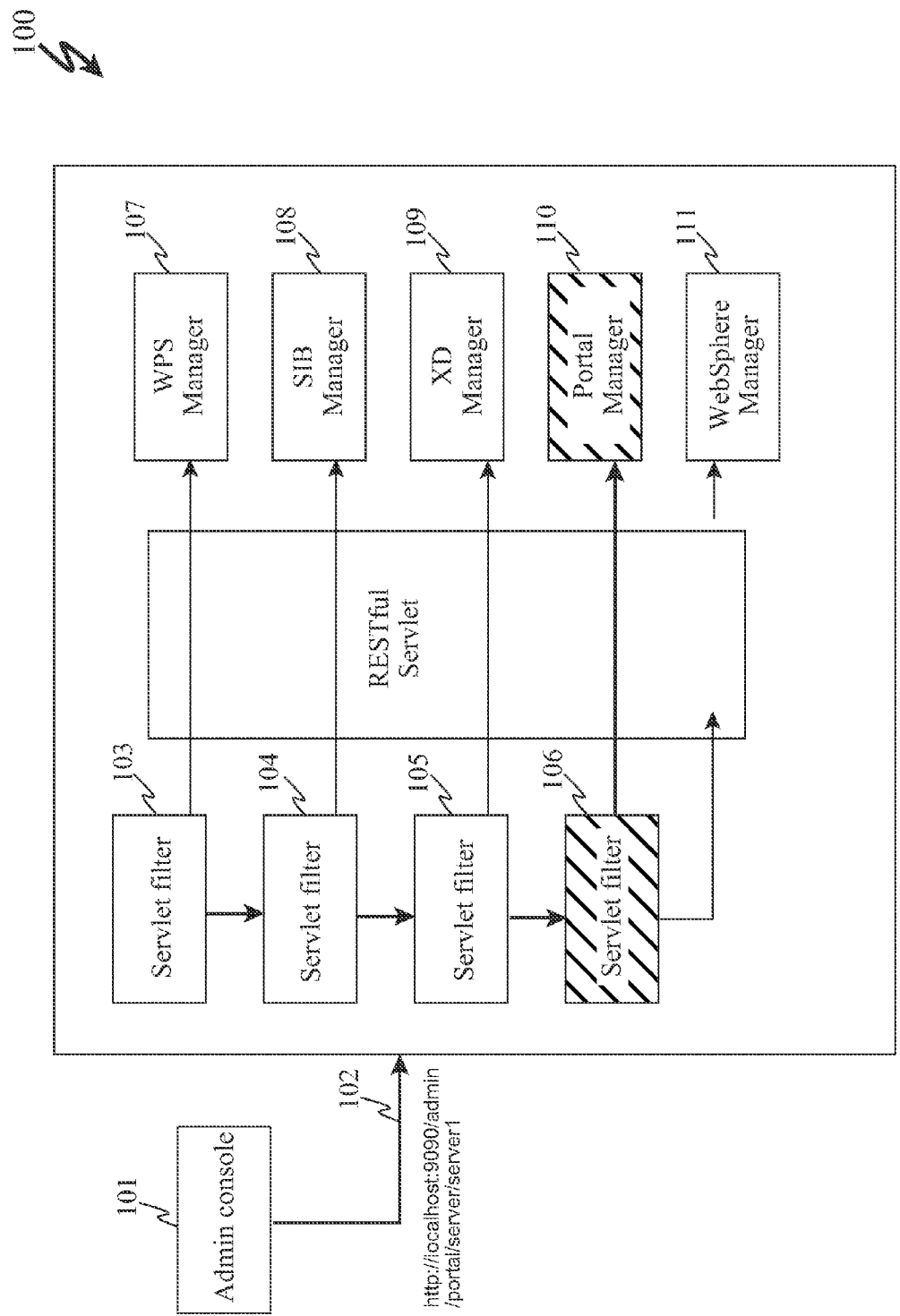
FIG. 1 which illustrates an example operation (100) of an embodiment according to the invention.

Bearing in mind the foregoing disclosure, we turn to FIG. 1 which illustrates an example operation (100) of an embodiment of the invention. A administrator using an administration console (101) desires to access a portal manager (110) servlet on a RESTful web server. The administrator identifies this with a request for a URL associated with the portal manager servlet (110), namely:

http://localhost:9090/admin/portal/server/server1

The unique portion "localhost:9090/admin/portal/server/server1" is pattern matched by a servlet filter (106) (shown with hash marks) among several servlet filters (103-105), and the request is directed according to the invention by the specific servlet filter (106) to its associated portal servlet (110) (shown with hash marks), among many available (107-109, 111) on the RESTful server.

Suitable Computing Platform

Figure 5:
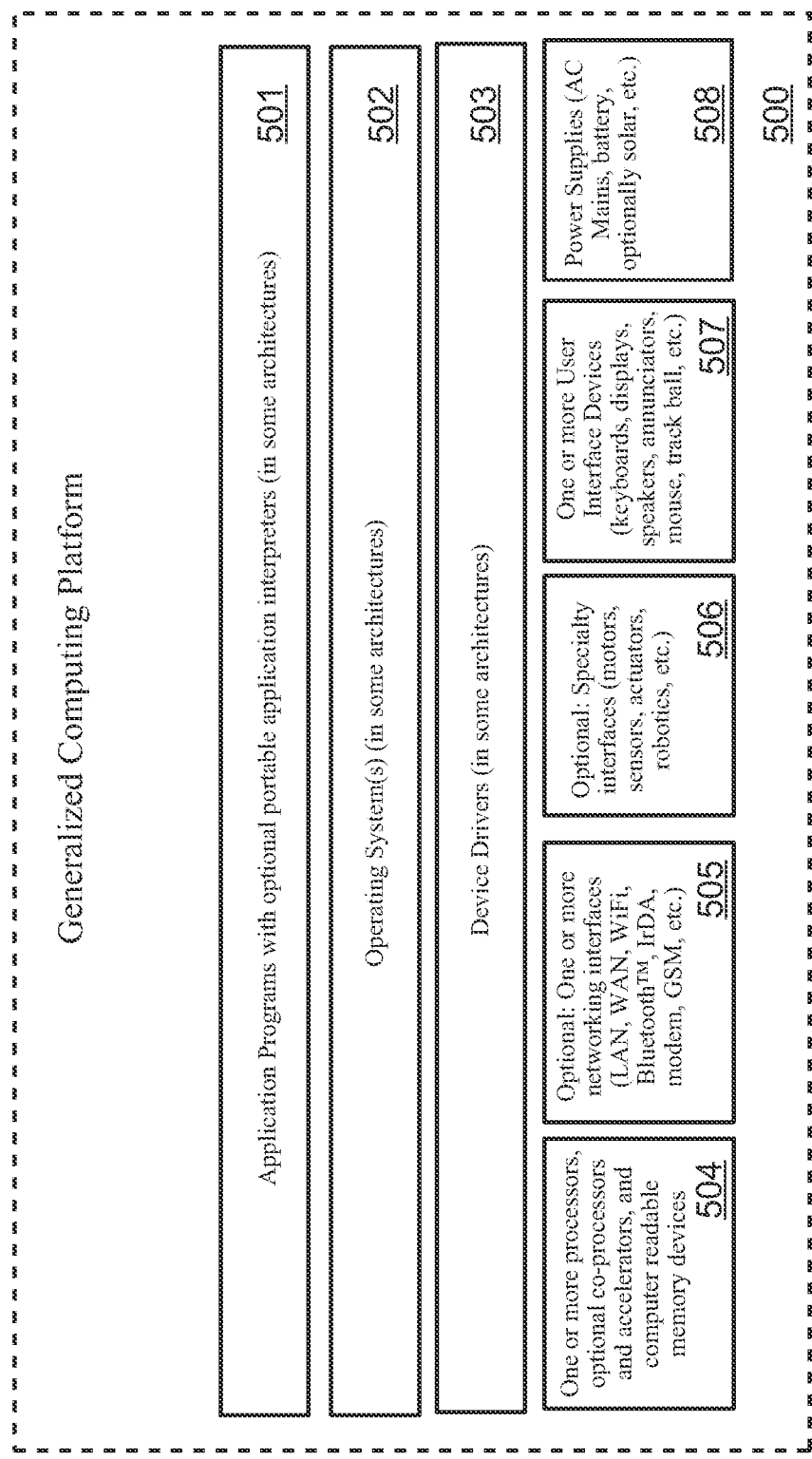
FIG. 5 depicts a generalization of a wide range of computing platforms.

Regarding computers for executing the logical processes set forth herein, it will be readily recognized by those skilled in the art that a variety of computers are suitable and will become suitable as memory, processing, and communications capacities of computers and portable devices increases. FIG. 5 illustrates a generalized computing platform (500), such as common and well-known computing platforms such as "Personal Computers", web servers such as an IBM iSeries server, and portable devices such as personal digital assistants and smart phones, running a popular operating systems (502) such as Microsoft™ Windows™ or IBM™ AIX™, Palm OS™, Microsoft Windows Mobile™, UNIX, LINUX, Google Android™, Apple iPhone™ operating system, and others, may be employed to execute one or more application programs to accomplish the computerized methods described herein. Whereas these computing platforms and operating systems are well known an openly described in any number of textbooks, websites, and public "open" specifications and recommendations, diagrams and further details of these computing systems in general (without the customized logical processes of the present invention) are readily available to those ordinarily skilled in the art.

Many such computing platforms, but not all, allow for the addition of or installation of application programs (501) which provide specific logical functionality and which allow the computing platform to be specialized in certain manners to perform certain jobs, thus rendering the computing platform into a specialized machine. In some "closed" architectures, this functionality is provided by the manufacturer and may not be modifiable by the end-user.

The hardware portion of a computing platform typically includes one or more processors (504) accompanied by, sometimes, specialized co-processors or accelerators, such as graphics accelerators, and by suitable computer readable memory devices (RAM, ROM, disk drives, removable memory cards, etc.). Depending on the computing platform, one or more network interfaces (505) may be provided, as well as specialty interfaces for specific applications. If the computing platform is intended to interact with human users, it is provided with one or more user interface devices (507), such as display(s), keyboards, pointing devices, speakers, etc. And, each computing platform requires one or more power supplies (battery, AC mains, solar, etc.).

Conclusion

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless specifically stated otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It will be readily recognized by those skilled in the art that the foregoing example embodiments do not define the extent or scope of the present invention, but instead are provided as illustrations of how to make and use at least one embodiment of the invention. The following claims define the extent and scope of at least one invention disclosed herein.

What is claimed is:

1. A computer-based method for controlling fine-grained security access to managed resources in a stateless web server architecture comprising:

extracting a request pattern including at least a password value from a valid relative path portion of a validly-formatted Uniform Resource Locator request;

mapping by a computer the extracted pattern to one or more application program components;

responsive to the mapping, performing by a computer fine-grained instance level security access to the application program component according to an assigned security constraint, wherein at least one security constraint comprises the extracted password associated with the role name, and wherein different security constraints are assigned to different unique resource locator patterns in each deployment descriptor of a stateless web server architecture; and responsive to successful security access, sending by a computer to a requester a Uniform Resource Locator request to the mapped application program component;

thereby providing different security access conditions to different instances of a same managed resource, and providing password authentication according to the pattern extracted from the relative path portion of the Uniform Resource Locator request.

2. The computer-based method as set forth in claim 1 wherein the mapping is performed by one or more associated servlet filters.

3. The computer-based method as set forth in claim 1 wherein different attributes are represented by respective resource locators within the extracted request pattern.

4. The computer-based method as set forth in claim 1 wherein the security constraints are stored in a web deployment descriptor disposed in computer storage memory.

5. The computer-based method as set forth in claim 3 wherein security constraints for each attribute are stored in a web deployment descriptor disposed in computer storage memory.

6. A computer program product for controlling fine-grained security access to managed resources in a stateless web server architecture comprising:

a computer-readable, storage memory device; and program instructions embodied by the computer-readable, storage memory device for causing a computer processor to perform steps comprising:

extracting a request pattern including at least a password value from a valid relative path portion of a validly-formatted Uniform Resource Locator request;

mapping by a computer the extracted pattern to one or more application program components;

responsive to the mapping, performing by a computer fine-grained instance level security access to the application program component according to an assigned security constraint, wherein at least one security constraint comprises the extracted password associated with the role name, and wherein different security constraints are assigned to different unique resource locator patterns in each deployment descriptor of a stateless web server architecture; and responsive to successful security access, sending by a computer to a requester a Uniform Resource Locator request to the mapped application program component;

thereby providing different security access conditions to different instances of a same managed resource, and providing password authentication according to the pattern extracted from the relative path portion of the Uniform Resource Locator request.

7. The computer program product as set forth in claim 6 wherein the mapping is performed by one or more associated servlet filters.

8. The computer program product as set forth in claim 6 wherein different attributes are represented by respective resource locators within the extracted request pattern.

9. The computer program product as set forth in claim 6 wherein the security constraints are stored in a web deployment descriptor disposed in computer storage memory.

10. The computer program product as set forth in claim 8 wherein security constraints for each attribute are stored in a web deployment descriptor disposed in computer storage memory.

11. A system for controlling fine-grained security access to managed resources in a stateless web server architecture comprising:
 a computer processor;
 a computer-readable, storage memory device communicably disposed to the computer processor; and
 program instructions embodied by the computer-readable, storage memory device for causing the computer processor to perform steps comprising:
  extracting a request pattern including at least a password value from a valid relative path portion of a validly-formatted Uniform Resource Locator request;
  mapping by a computer the extracted pattern to one or more application program components;
  responsive to the mapping, performing by a computer fine-grained instance level security access to the application program component according to an assigned security constraint, wherein at least one security constraint comprises the extracted password associated with the role name, and wherein different security constraints are assigned to different unique resource locator patterns in each deployment descriptor of a stateless web server architecture; and
  responsive to successful security access, sending by a computer to a requester a Uniform Resource Locator request to the mapped application program component;
 thereby providing different security access conditions to different instances of a same managed resource, and providing password authentication according to the pattern extracted from the relative path portion of the Uniform Resource Locator request.

12. The system as set forth in claim 11 wherein the mapping is performed by one or more associated servlet filters.

13. The system as set forth in claim 11 wherein different attributes are represented by respective resource locators within the extracted request pattern.

14. The system as set forth in claim 11 wherein the security constraints are stored in a web deployment descriptor disposed in computer storage memory.

15. The system as set forth in claim 13 wherein security constraints for each attribute are stored in a web deployment descriptor disposed in computer storage memory.

\* \* \* \* \*